United States Patent
Yu

(10) Patent No.: US 7,736,567 B2
(45) Date of Patent: Jun. 15, 2010

(54) METHOD OF MOLDING PRODUCT WITH SURFACE FILM

(75) Inventor: Tsung-Wen Yu, Taichung Hsien (TW)

(73) Assignee: Snyang Yu Enterprise Co., Ltd., Ta Li, Taichung Hsien (TW)

( * ) Notice: Subject to any disclaimer, the term of this patent is extended or adjusted under 35 U.S.C. 154(b) by 327 days.

(21) Appl. No.: 11/702,213

(22) Filed: Feb. 5, 2007

(65) Prior Publication Data

US 2008/0143023 A1      Jun. 19, 2008

(51) Int. Cl.
   *B29C 45/14*       (2006.01)
   *B29C 45/16*       (2006.01)

(52) U.S. Cl. ............... 264/266; 264/275; 264/511; 264/513

(58) Field of Classification Search .......... 264/511, 264/266, 275, 294, 513, 553; 425/112
See application file for complete search history.

(56) References Cited

U.S. PATENT DOCUMENTS

| | | | | |
|---|---|---|---|---|
| 5,344,305 A | * | 9/1994 | McKillip | 425/503 |
| 5,676,981 A | * | 10/1997 | Miyazawa et al. | 425/112 |
| 5,707,581 A | * | 1/1998 | Yamazaki | 264/511 |
| 5,759,684 A | * | 6/1998 | Atake | 428/32.63 |
| 6,045,738 A | * | 4/2000 | Atake | 264/511 |
| 6,045,744 A | * | 4/2000 | Kobayashi et al. | 264/511 |
| 6,071,456 A | * | 6/2000 | Hanamoto et al. | 264/265 |
| 6,174,488 B1 | * | 1/2001 | Usui et al. | 264/511 |
| 6,648,621 B2 | * | 11/2003 | Oono et al. | 425/112 |
| 6,682,819 B2 | * | 1/2004 | Damo | 428/423.1 |
| 6,852,268 B1 | * | 2/2005 | Valyi et al. | 264/266 |
| 2007/0007690 A1 | * | 1/2007 | Atake | 264/259 |

FOREIGN PATENT DOCUMENTS

WO    WO2005/051660    *  9/2005
WO    WO2005/021233    *  10/2005

* cited by examiner

*Primary Examiner*—Joseph S Del Sole
*Assistant Examiner*—Robert Dye
(74) *Attorney, Agent, or Firm*—Browdy and Neimark, PLLC

(57) ABSTRACT

The present invention provides a die with a first die member, a second die member and a holder device between the first die member and the second die member. A film is sent to the die between the holder device and the second die member. And then, operating the holder device toward the second die member to press the film on the second die member, and softening and molding the film in the second die member. Next, moving the first die member toward the second die member to close the die, and then performing an injection molding process to inject a molten material into the die. The molten material is combined with the film to form a product with the film on a surface thereof.

12 Claims, 14 Drawing Sheets

METHOD OF MOLDING PRODUCT WITH SURFACE FILM

BACKGROUND OF THE INVENTION

1. Field of the Invention

The present invention relates generally to a surface decoration process, and more particularly to a method of molding a product with a surface film in a die.

2. Description of the Related Art

In the requirement of high precision and quality of plastic products, there are various surface decoration processes. For a process of attaching a surface film on a substrate in a die, the film is printed and decorated, and then is formed into a specific shape by high pressure gas and cut by a cutter to have a desired size. After that, the film is put in a die for injection molding. The product of injection molding has the film thereon to provide the function of wear-proof and durable texture or pattern. The film, however, is formed in different time before being put in the die so that the film may be not attached on a sidewall of a cavity of the die tightly because of its expansibility (or shrinkage) causing change of size or shape. Such condition may cause rupture of the film when molten plastic under high temperature and pressure is injected into the die. It causes shifting of texture or pattern on the products to increase the defect rate.

To fix above problem, an improved process, as shown in FIG. 1 to FIG. 5, was provided, which provides a die 1 with a first die member 2 and a second die member 3. The first die member 2 includes a first surface 2a and a protrusion 2b on the first surface 2a. The second die member 3 includes a second surface 3a and a recess 3b on the second surface 3a. The first step of the process is putting an elongated film 4 between the first die member 2 and the second die member 3 (the film 4 keeps a predetermined distance from the second die member 3). The second step is moving a heater 6 to a position above the film 4 and then moving it downward to press the film 4 onto the second surface 3a of the second die member 3. The heater 6 has a heating surface 6a against the film 4 to soften the film 4. A pump (not shown) is connected to the second die member 3 to suck air in the recess 3b out. As a result, the film 4 is sucked into the recess 3b and attached on a sidewall of the recess 3b. Next, moving the heater 6 out and moving the first die member 2 toward the second die member 3 with the protrusion 2b of the first die member 2 entering the recess 3b of the second die member 3. An injection molding process is performed to inject plastic onto the film 4. After that, the die 1 is opened to have a product with the film 4 thereon. The product with the film 4 thereon has no drawback as described above.

The product made by above method has the film 4 thereon for protection. The film 4 provides functions of wear-proof and preventing textures or pattern on the product from breaking or loosing. However, above method still has some drawbacks.

In the heating step, as shown in FIG. 2, the heater 6 almost touches the film that will melt the film 4. If the film 4 were not molten in the heating step, the heater 6 presses a margin of the film 4 in the following step, as shown in FIG. 3. In this moment, the film 4 is easy to be molten and the injection molding will be stopped when the film 4 is molten. Even though the film 4 can take the high temperature of the heater 6, it always warps by the changeable temperature of the heater 6 that makes a waved surface of the product and a bend angle of the product less than seventy degrees to narrow the applications of the product. In addition, the film 4 may be stuck on the heater 6 that the film 4 goes with the heater rather than on the second die member 3.

The injection molding process will be stopped when any problem as described above is occurred, and the process goes again when the problem has been fixed. It causes stop of manufacture and waste of materials. That is, above method still has to be improved.

SUMMARY OF THE INVENTION

The primary objective of the present invention is to provide a method of molding a product with a surface film, which the surface film has less chance to be molten.

According to the objective of the present invention, a method of the present invention provides a die with a first die member, a second die member and a holder device between the first die member and the second die member. A film is sent to the die between the holder device and the second die member. And then, operating the holder device toward the second die member to press the film on the second die member, and softening and molding the film in the second die member. Next, moving the first die member toward the second die member to close the die, and then performing an injection molding process to inject a molten material into the die. The molten material is combined with the film to form a product with the film on a surface thereof.

DETAILED DESCRIPTION OF THE INVENTION

Figure 2:
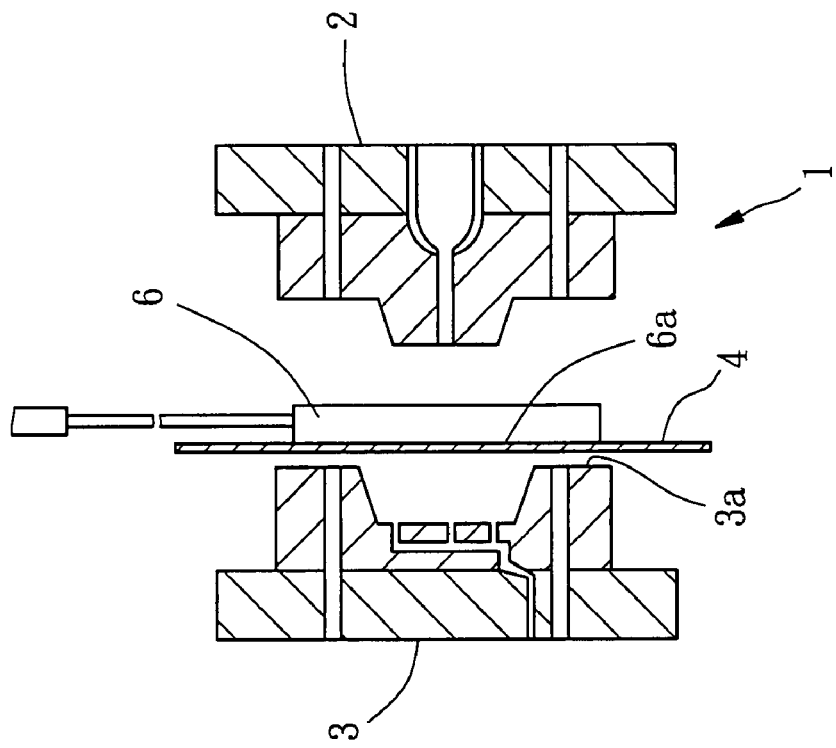
FIG. 1 to FIG. 5 are sectional views of the conventional process.
Figure 1:
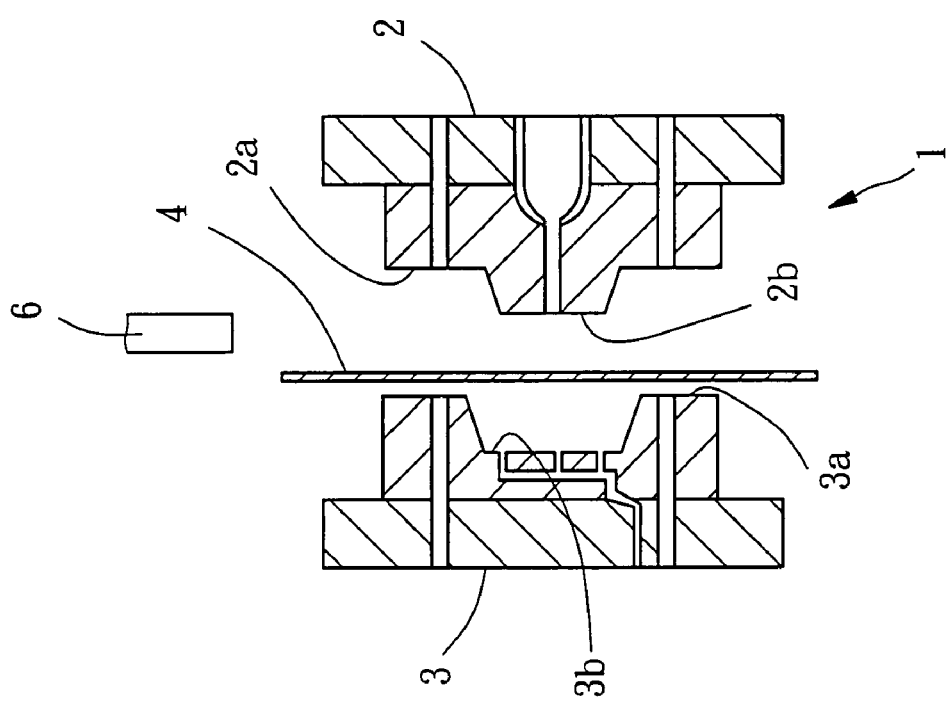
Figure 4:
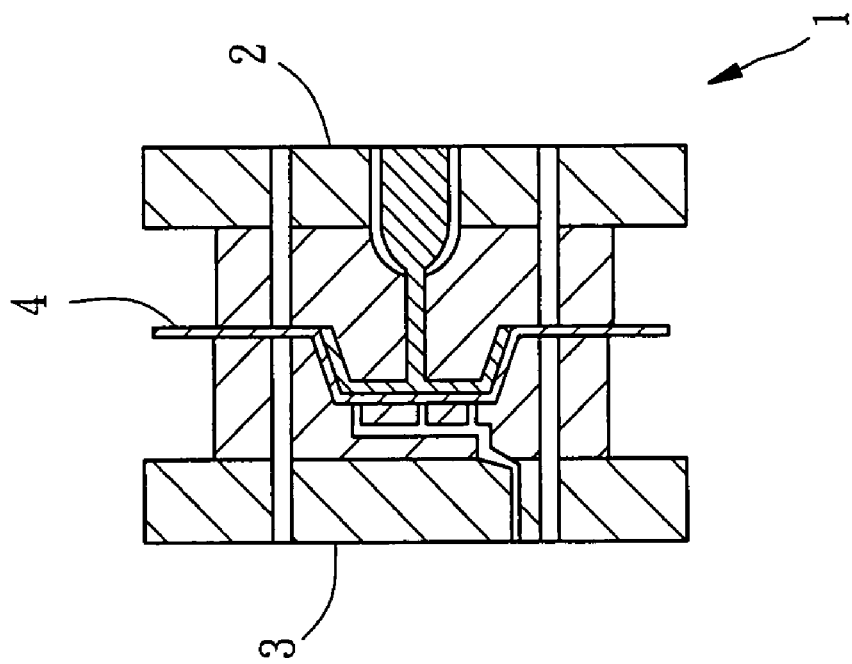
Figure 3:
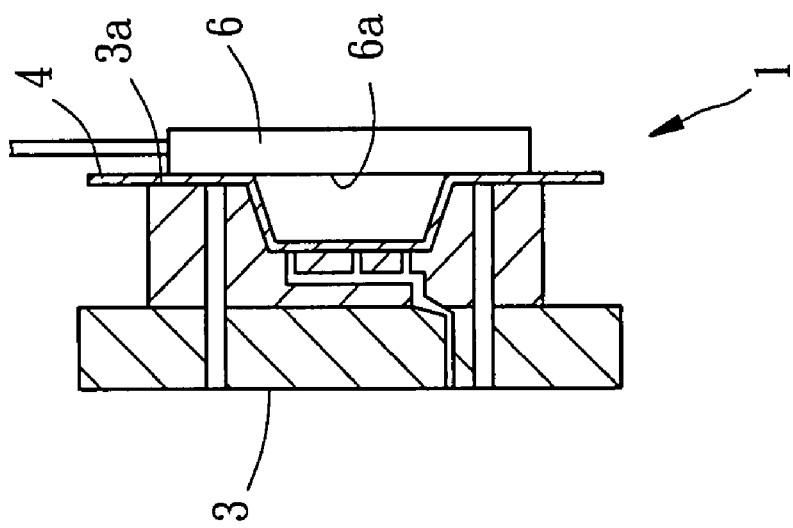
Figure 5:
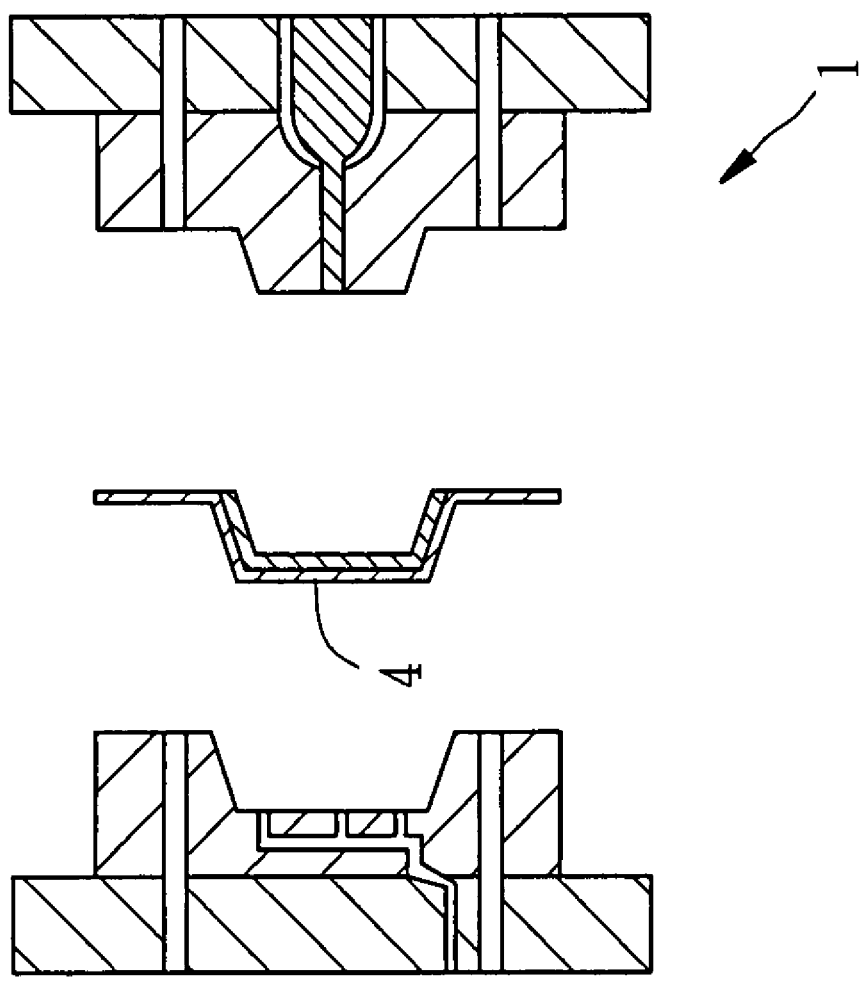
Figure 6:
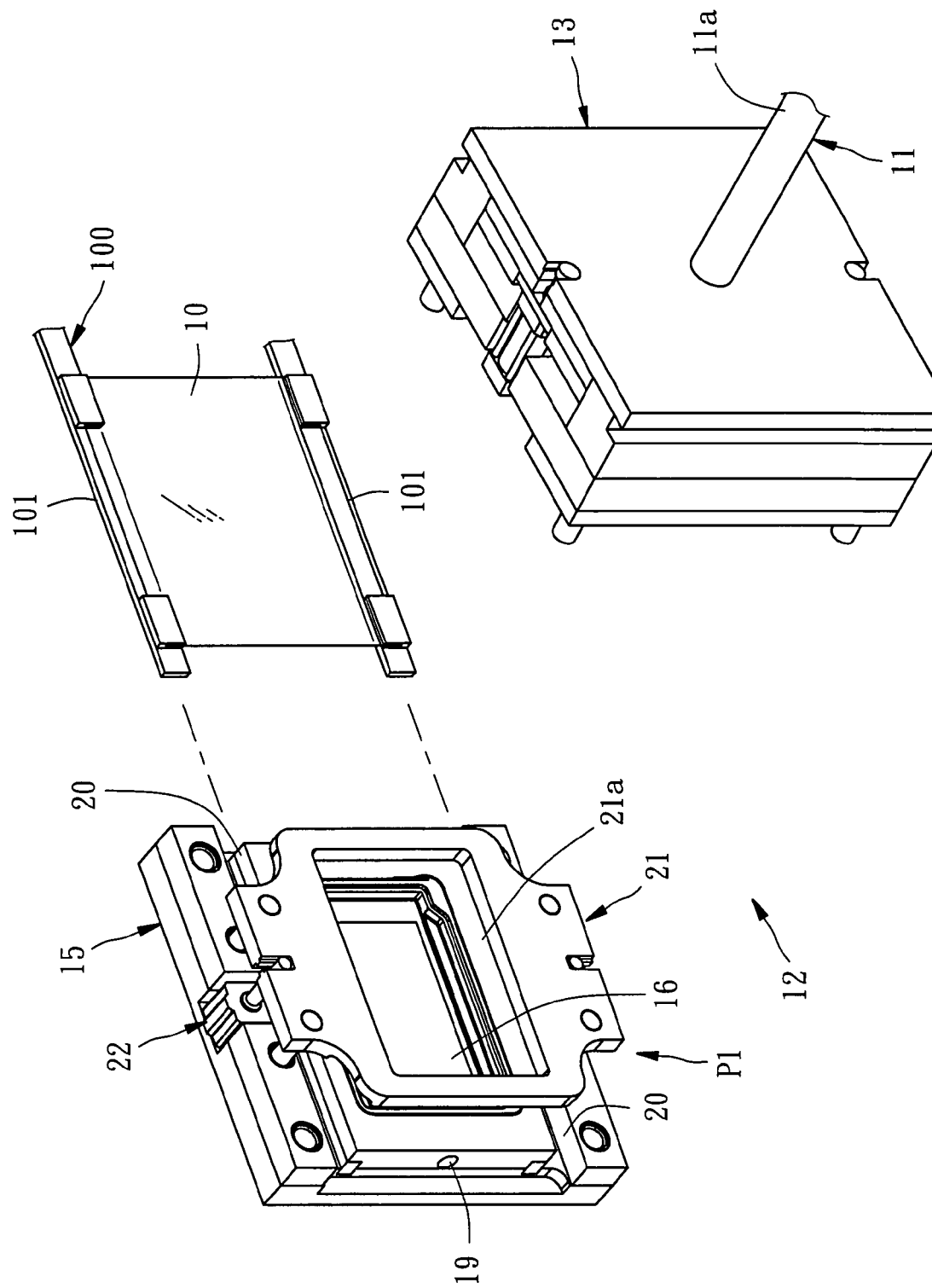
FIG. 6 is a perspective view of a preferred embodiment of the present invention, showing positions of the film, the die and the injection molding machine.

As shown in FIGS. 6 to 16, a method of making a substrate with a surface film includes the following steps:

First, preparing a film 10. In the present embodiment, the film 10 had been cut into a predetermined size and provided with textures or a pattern thereon. The film 10 is put on a feeding device 100. The feeding device 100 cuts the film 10 into the predetermined size and adjusts a position of the film 10, and then the feeding device 100 has two arms 101 holding opposite ends of the film 10 for the following step.

Second, preparing an injection molding machine 11 and a die 12. The injection molding machine 11 includes a nozzle 11a connected to the die 12. In the present embodiment, the die 12 includes a first die member 13, a second die member 15 and a holder device 21 between the first and the second die members 13, 15. The first die member 13, which the injection molding machine 11 is connected to, is moved by operation. The first die member 13 includes a protrusion 14, in which a tunnel is provided. The nozzle 11a is connected to the tunnel to inject a molten plastic material therethrough. The second die member 15 is a fixed member, and the first die member 13 is moved toward or away from the second die member 15 for closing or opening the die 12. The second die member 15 includes a recess 16 with a bend angle greater than seventy degrees, an aperture 18 (referring to FIG. 14) on a bend position of the recess 16 and a channel 19 (referring to FIG. 6) communicated with the aperture 18. A pump (not shown) is connected to the channel 19 of the second die member 15 for pumping gas into or out of the recess 16 through the channel 19 and the aperture 18. The second die member 15 further includes two elongated slots 20 at opposite sides of the recess 16. The arms 101 can enter the slots 20 for fast feeding the film 10. The holder device 21 is moved by a cylinder assembly 22 for reciprocation between a first position P1 (referring to FIG. 8), in which the holder device 21 keeps a predetermined distance from the second die member 15, and a second position P2 (referring to FIG. 9), in which the holder device 21 touches the second die member 15. The holder device 21 is located at the first position P1 before the film 10 is put in the die 12 (referring to FIG. 6). The holder device 21 has a hollow portion associated with the recess 16 (referring to FIG. 6 and FIG. 14).

Figure 7:
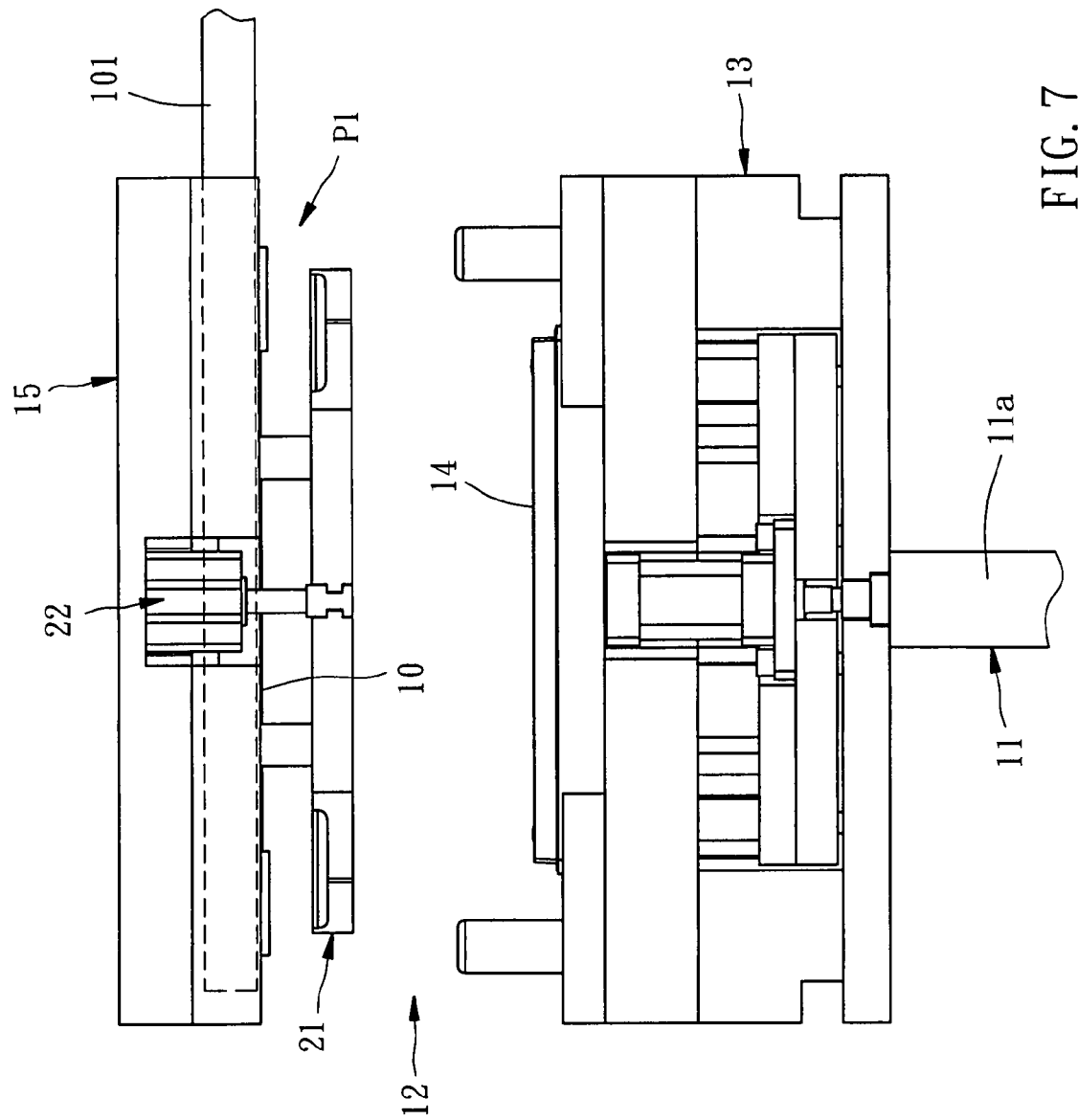
FIG. 7 is a top view of the preferred embodiment of the present invention, showing the arm holding the film and moving into the slot.
Figure 8:
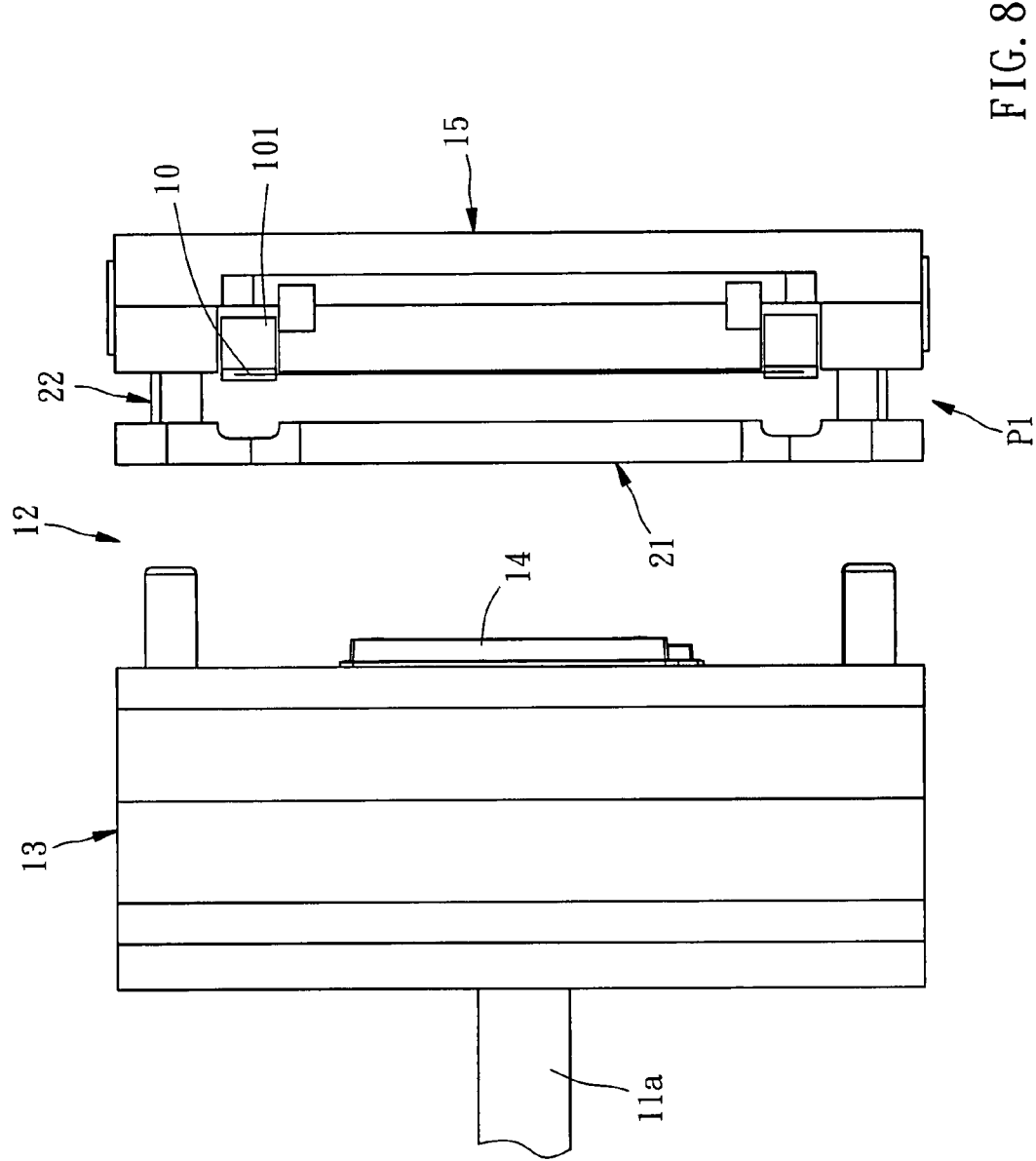
FIG. 8 is a lateral view of FIG. 7.
Figure 9:
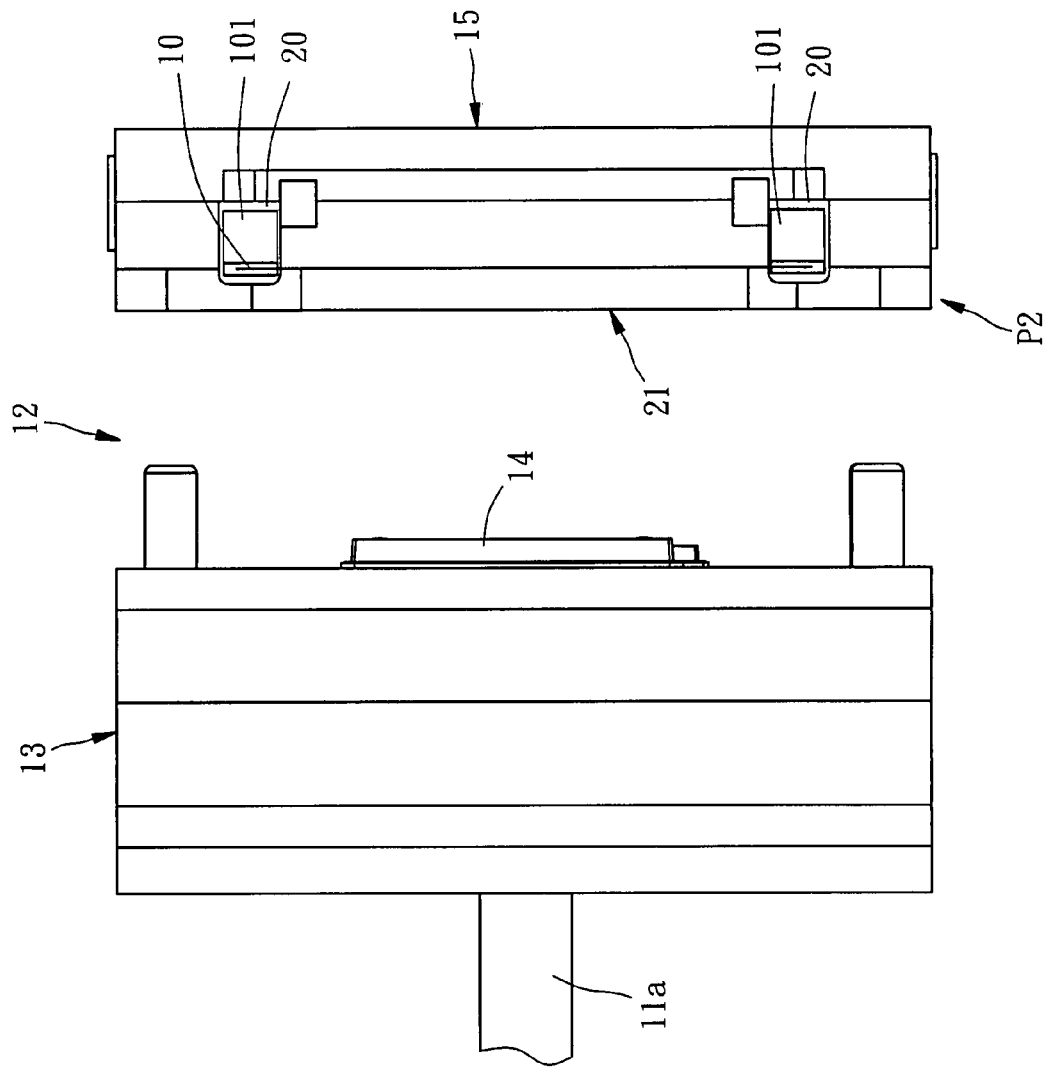
FIG. 9 is a lateral view of the preferred embodiment of the present invention, showing the holder device holding the film and the arm still in the slot.
Figure 10:
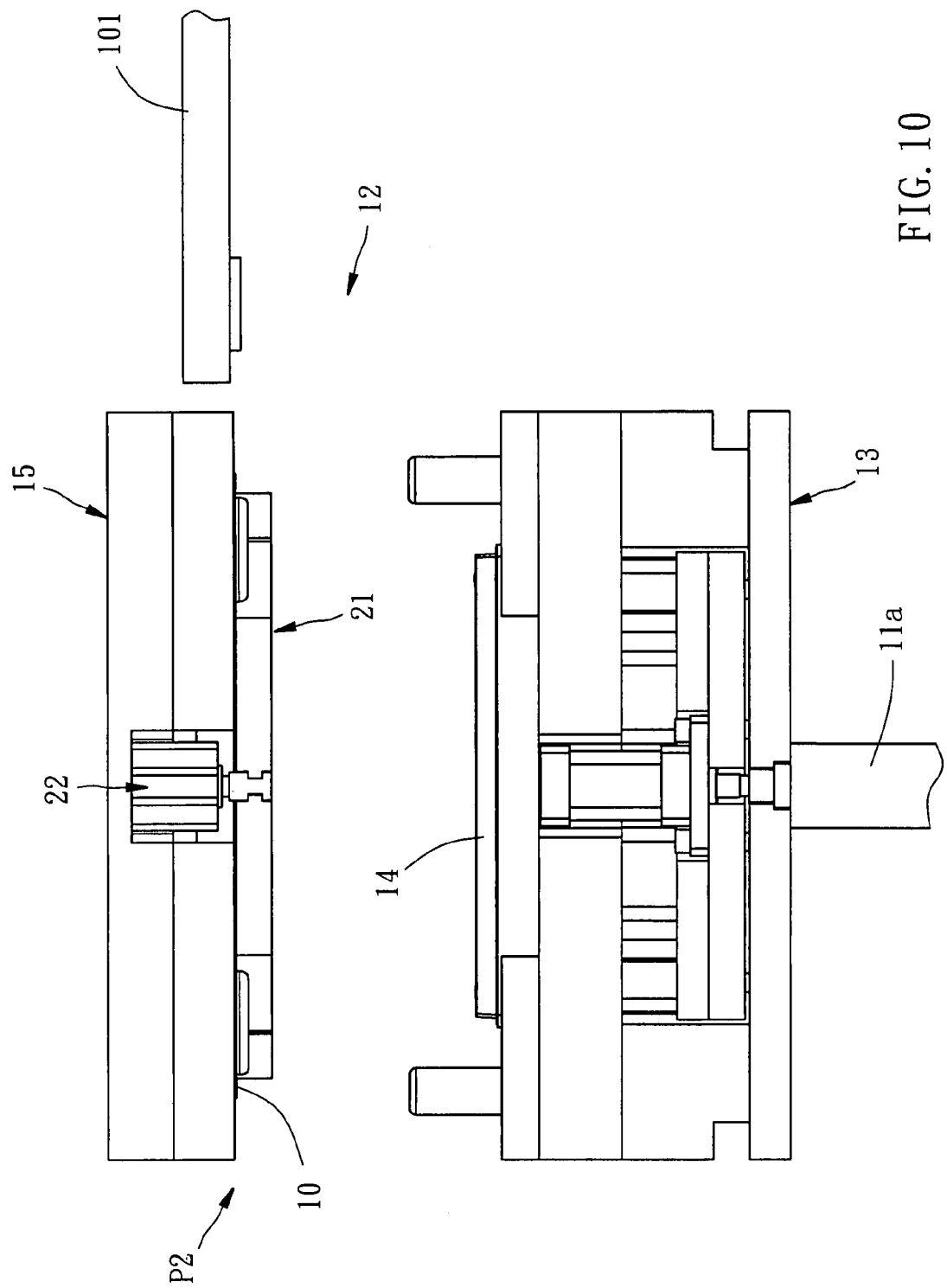
FIG. 10 is a top view of the preferred embodiment of the present invention, showing the holder device holding the film and the arm moving out of the slot.
Figure 11:
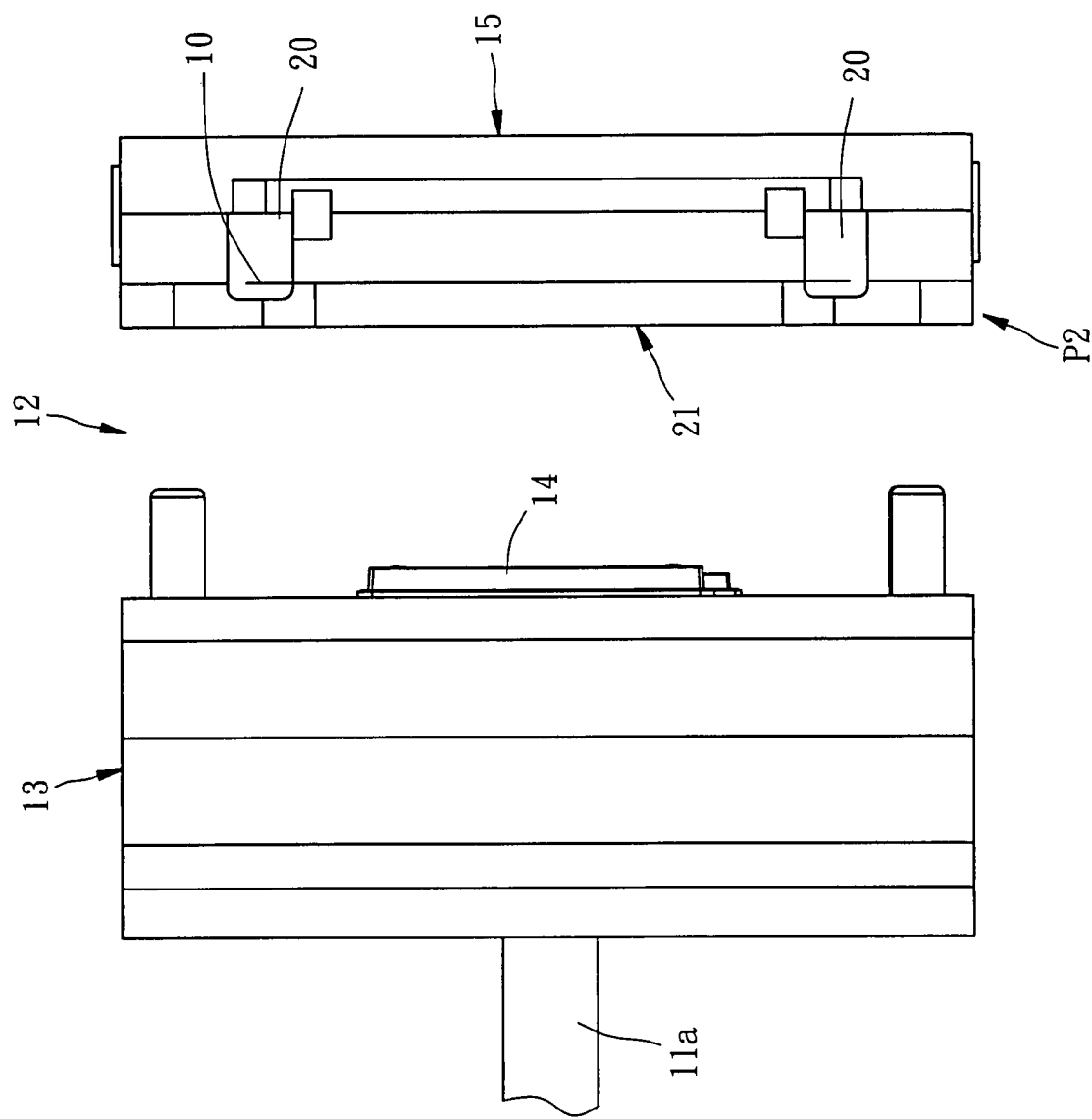
FIG. 11 is a lateral view of the preferred embodiment of the present invention, showing the holder device holding the film and the arm moving out of the slot.
Figure 12:
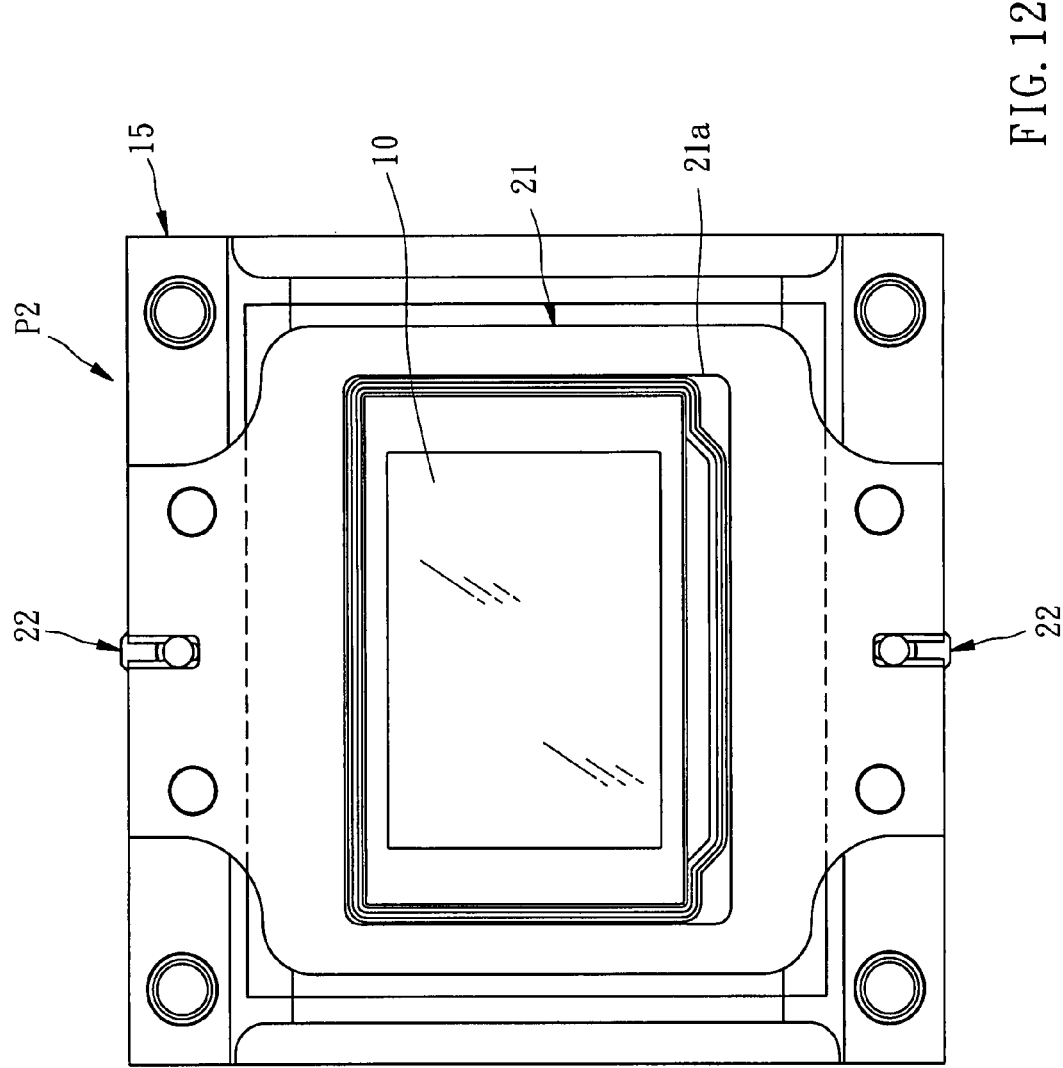
FIG. 12 is a front view of FIG. 9.

Third, as shown in FIG. 7 and FIG. 8, operating the arms 101 to hold the film 10 and move into the slots 20 for transporting the film 10 to a position between the second die member 15 and the holder device 21. After that, operating the cylinder assembly 22 to move the holder device 21 to the second position P2 (referring to FIG. 9) so that the holder device 21 presses the film 10 on the second die member 15. Next, the arms 101 release the film 10 and move out of the slots 20 (referring to FIG. 10 and FIG. 11) so that a margin of the film 10 is pressed by the holder device 21 (referring to FIG. 12). After that, the film 10 is put in the die 12 and the film 10 seals the recess 16 of the second die member 15.

Figure 13:
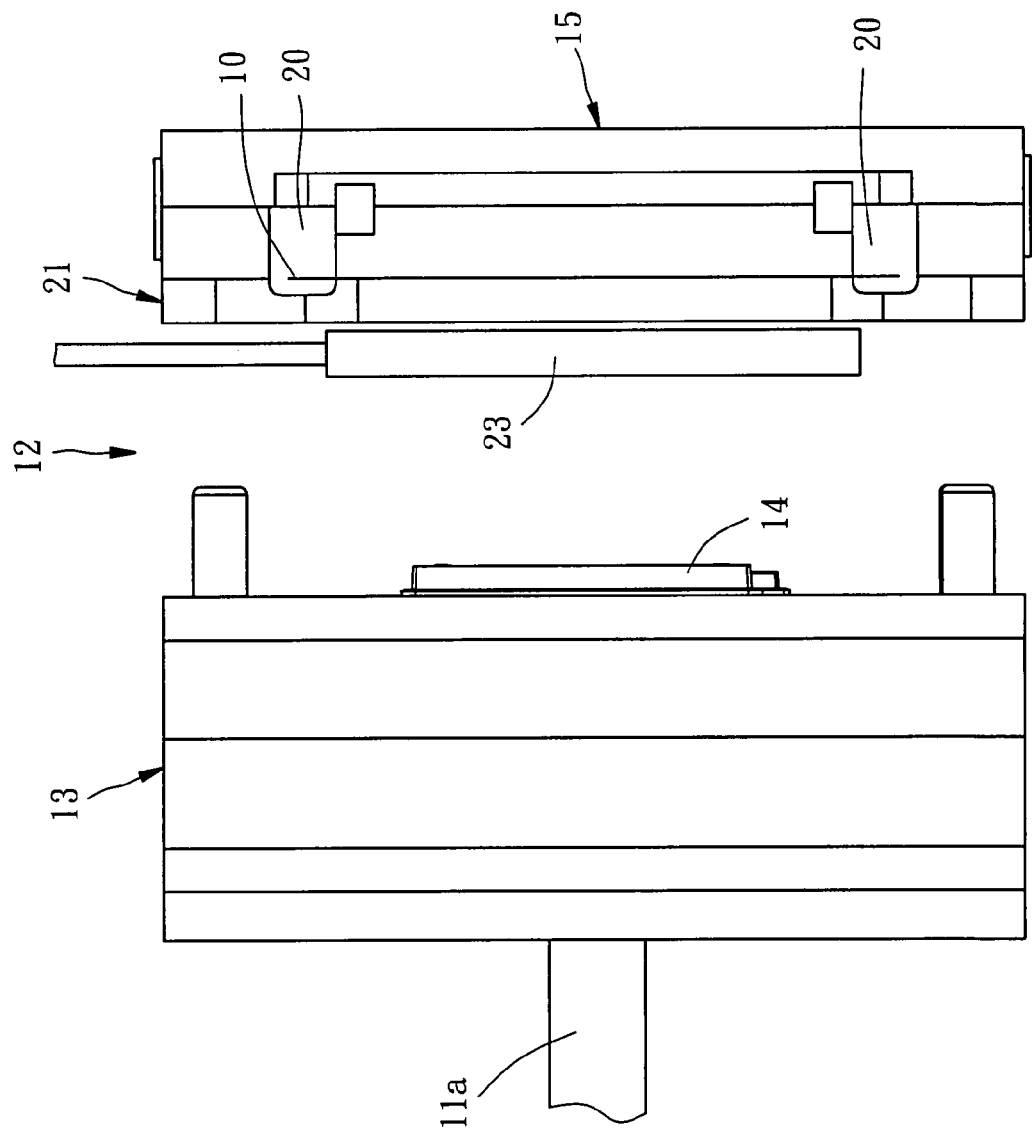
FIG. 13 is a lateral view of the preferred embodiment of the present invention, showing the film heated by the heater.
Figure 14:
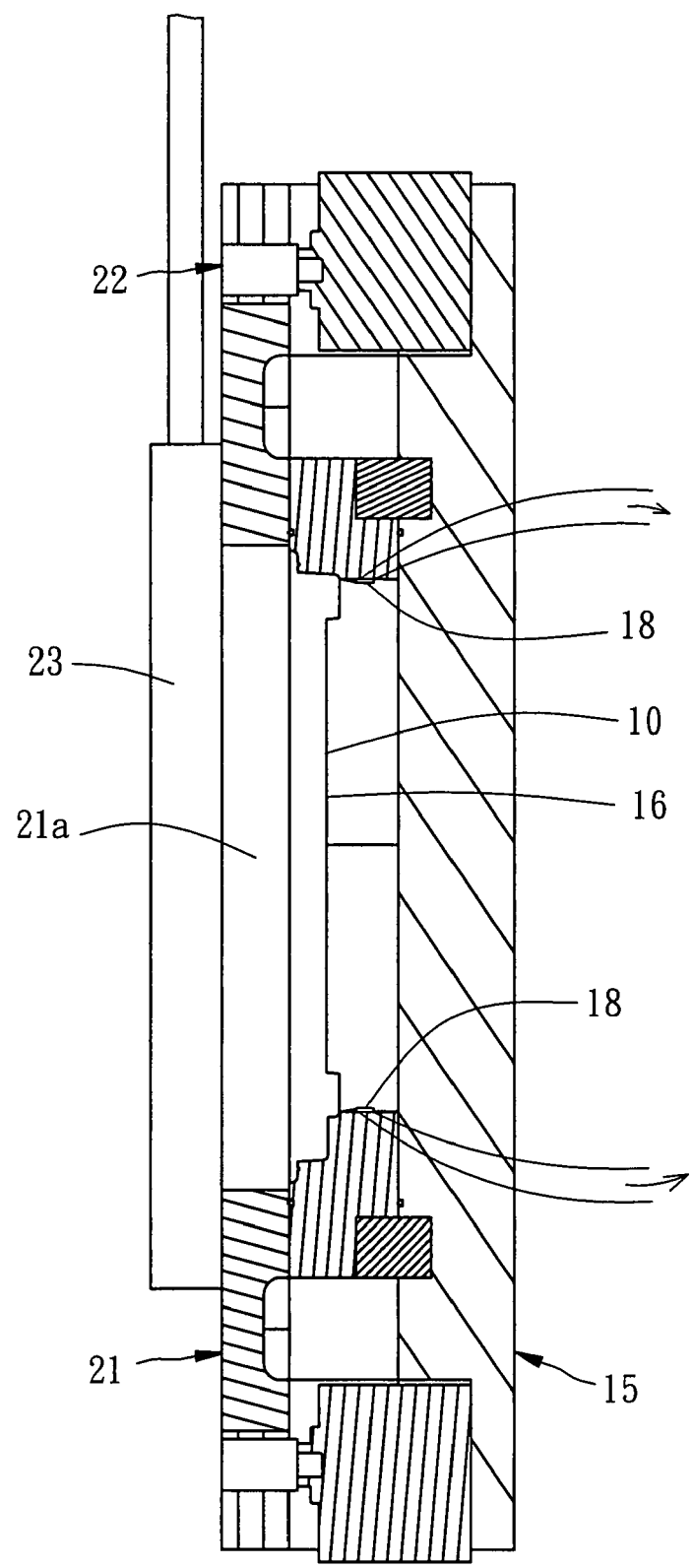
FIG. 14 is a sectional view of the preferred embodiment of the present invention, showing the film being sucked onto the second die member.

Fourth, performing a heating and sucking step. As shown in FIG. 13 and FIG. 14, moving an external heater 23 to a position above the hollow portion 21a of the holder device 21. The external heater 23 keeps a predetermined distance from the holder device 21 (about a thickness of the holder device 21) and heats the film 10 that the film 10 will be softened and will not damage by the heat. While the film 10 is softened, starting the pump for pumping gas in the recess 16 out and a low pressure in the recess 16 will suck the film 10 onto a sidewall of the recess 16 (referring to FIG. 14). The external heater 23 keeps a distance from the film 10 may heat the film 10 in a uniform condition that makes the film 10 pressing on the sidewall of the recess 16 tightly to form a precise shape for increasing the application range of the products.

Figure 15:
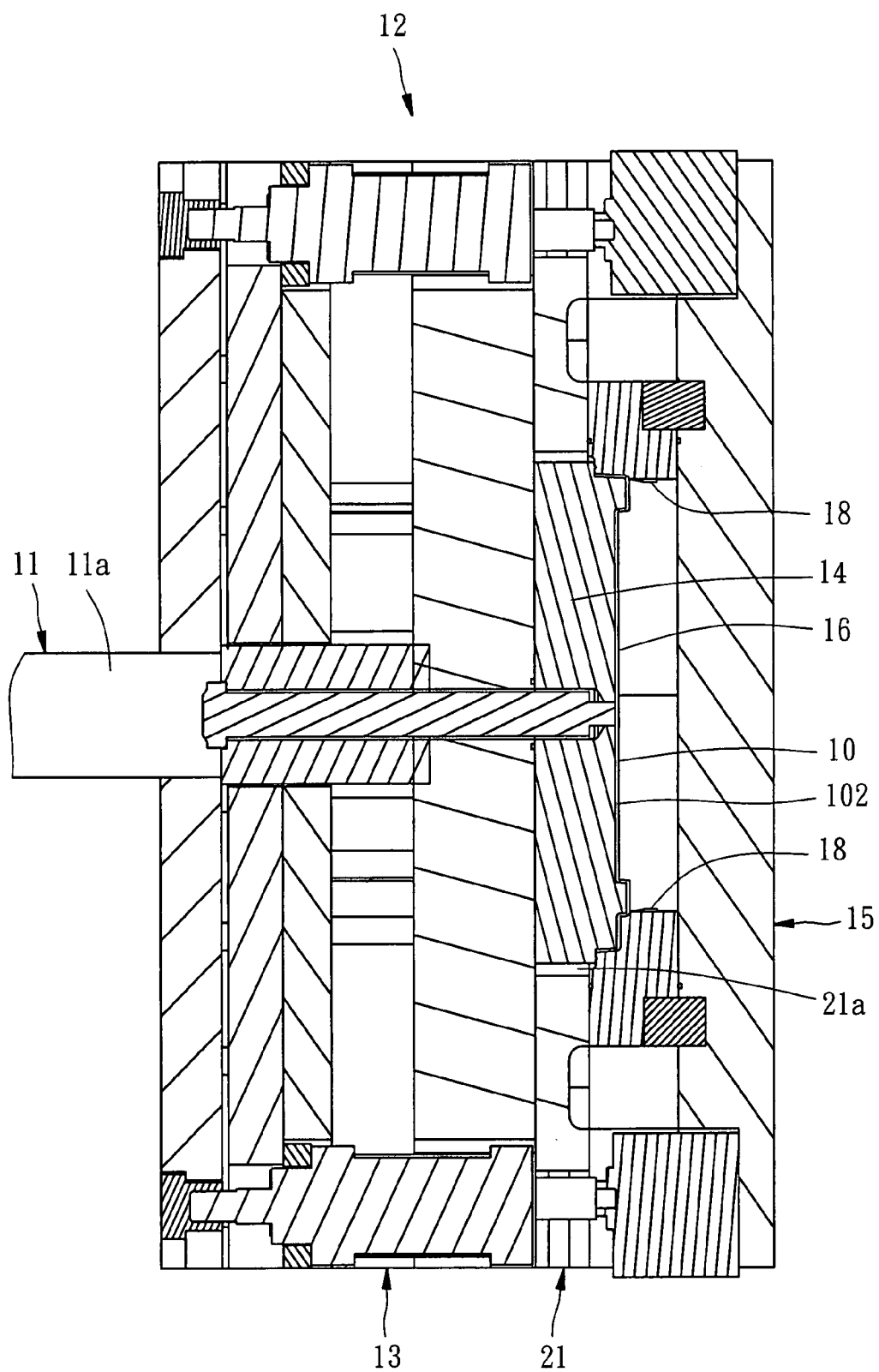
FIG. 15 is a sectional view of the preferred embodiment of the present invention, showing the die closed for injection molding.
Figure 16:
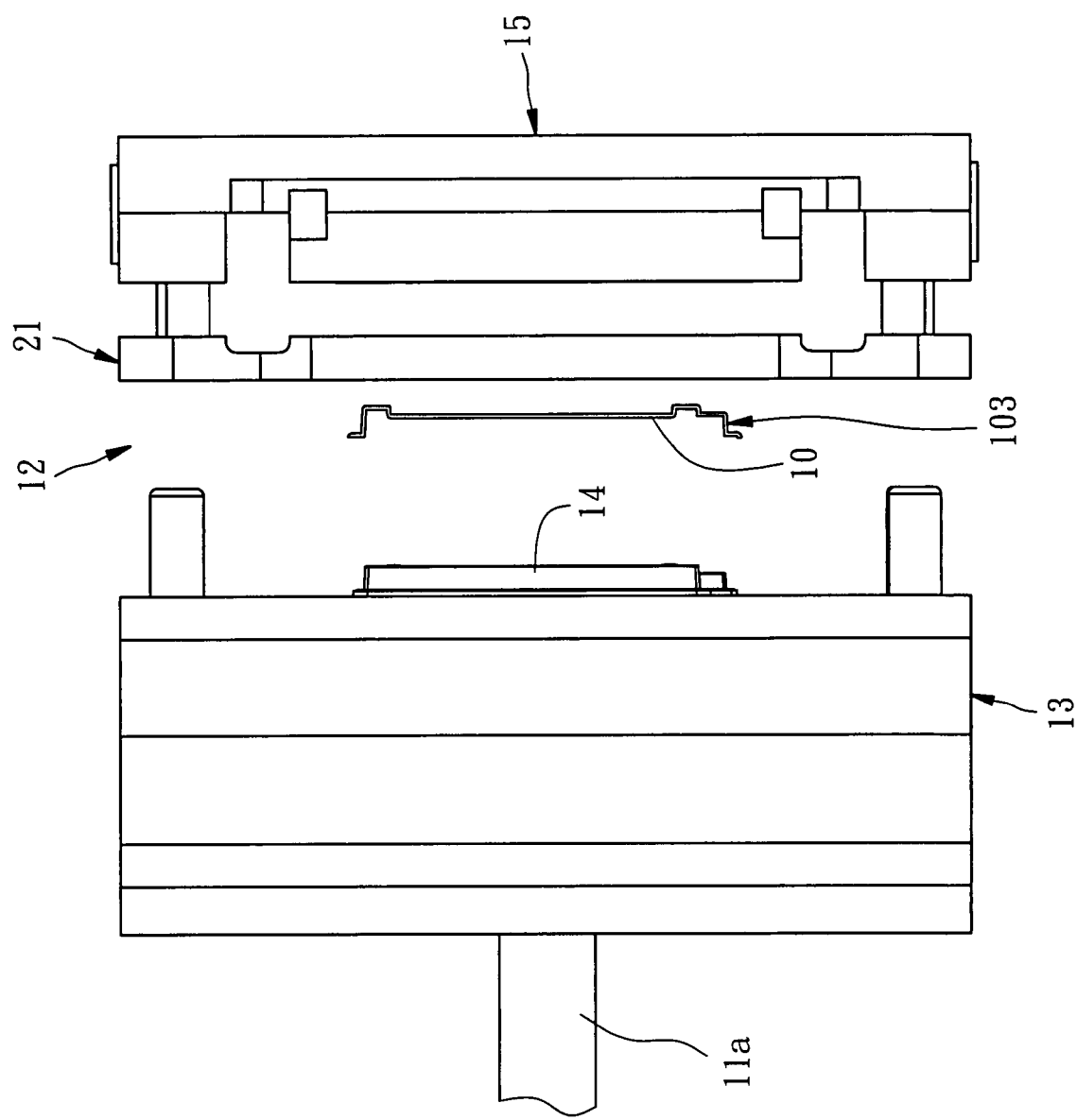
FIG. 16 is a lateral view of the preferred embodiment of the present invention, showing the die opened.

Fifth, performing injection molding process. As shown in FIG. 15, moving the first die member 13 toward the second die member 15 with the protrusion 14 entering the recess 16 through the hollow portion 21a of the holder device 21 to close the die 12 and form a cavity 102 between the protrusion 14 and the sidewall of the recess 16 in the die 12. The film 12 is located in the cavity 102. The injection molding machine 11 injects the molten plastic material into the cavity 102 of the die 12 via the nozzle 11a. The molten plastic material will be combined with the film 10 to form a substrate with the film 10 on a surface thereof. After the injection molding process, the pump is shut off.

Finally, moving the first die member 13 away from the second die member 13 and starting the pump again to pump gas into the recess 16 that a product 103 with the film 10 on a surface thereof is gotten.

The present invention provides the holder device 21 to hold the film 10, the external heater 23, which keeps a distance from the film 10, to heat the film 10 and the aperture 18 on the sidewall of the recess 16 of the second die member 15 that the product 103 made by the present invention has a greater bend angle to enlarge the application range and increase the precision and quality of the products.

It has to be mentioned that the present invention sucks gas out of the recess 16 of the second die member 15 in the step of heating the film 10. In practice, it may pump gas into the recess 16 of the second die member 15 to press the film 10 on the sidewall of the recess 16 or other relative techniques. In addition, the cylinder assembly 22 is not necessary to be connected to the second die member 15 while the cylinder assembly 22 may move the holder device 21 between the first position P1 and the second position P2.

The description above is a few preferred embodiments of the present invention and the equivalence of the present invention is still in the scope of the claim of the present invention.

What is claimed is:

1. A method, comprising:

providing a film that is cut into a predetermined size;

providing a die and an injection molding machine, wherein the die includes a first die member, a second die member and a holder device between the first die member and the second die member, the injection molding machine is connected to the first die member of the die, and the holder device is connected to the second die member and is operated to be moved between a first position, in which the holder device keeps a predetermined distance from the second die member, and a second position, in which the holder device touches the second die member;

holding the cut film by a feeding device along a feeding direction and feeding the film to a position between the second die member and the holder device, wherein the holder device is located at the first position, and the feeding device has two arms for holding the film vertically and putting the film into the die by reciprocating horizontally in a straight line;

moving the holder device to the second position from the first position to press the film on the second die member;

controlling the arms to release the film and to move out of the die;

heating and molding the film into a predetermined shape in the second die member;

moving the first die member toward the second die member to form a cavity in the die, wherein the film is received in a sidewall of the cavity;

operating the injection molding machine to inject a material into the cavity of the die, wherein the film is combined with the material to form a product with the film on a surface thereof; and moving the first die member away from the second die member to take the product out.

2. The method as defined in claim 1, wherein the first die member includes a protrusion, and the second die member includes a recess, and the holder device includes a hollow portion associated with the recess of the second die member, and the protrusion enters the recess through the hollow portion of the holder device when the first die member is moved toward the second die member, and the first die member includes a tunnel in the protrusion to which the injection molding machine is connected.

3. The method as defined in claim 1, wherein the holder device is moved by a cylinder assembly, which is connected to the second die member, to be moved between the first position and the second position.

4. The method as defined in claim 1, wherein the second die member includes two slots, and the arms of the feeding device holds the film and move into the slots to move the film to the position between the holder device and the second die member, and the arms release the film and move out of the slots when the holder member is moved to the second position.

5. The method as defined in claim 2, wherein the film is heated to be softened and attached on the sidewall of the recess.

6. The method as defined in claim 5, further comprising a step of pumping gas out of the recess to suck the film on the sidewall of the recess.

7. The method as defined in claim 5, further comprising a step of pumping gas into the recess to press the film on the sidewall of the recess.

8. The method as defined in claim 5, wherein the film is heated by a heater, which is moved to a position between the holder device and the first die member and keeps a predetermined distance from the holder device before heating, and a pump is connected to the second die member to pump gas in the recess of the second die member out when the film is softened by the heater, and the pump is stopped before the step of opening the die.

9. The method as defined in claim 8, wherein the pump pumps gas into the recess after the step of opening the die.

10. The method as defined in claim 2, wherein the recess has a bend angle greater than seventy degrees.

11. The method defined in claim 1, wherein the cut film has four corners and said arms hold the cut film at the four corners.

12. The method defined in claim 1, wherein the holder device is mounted to one of the die members to be held in position between the die members.

* * * * *